H. H. CUMMINGS.
COIN CONTROLLED TARGET PRACTICE APPARATUS.
APPLICATION FILED AUG. 10, 1903.
941,360.
Patented Nov. 30, 1909.
6 SHEETS—SHEET 1.
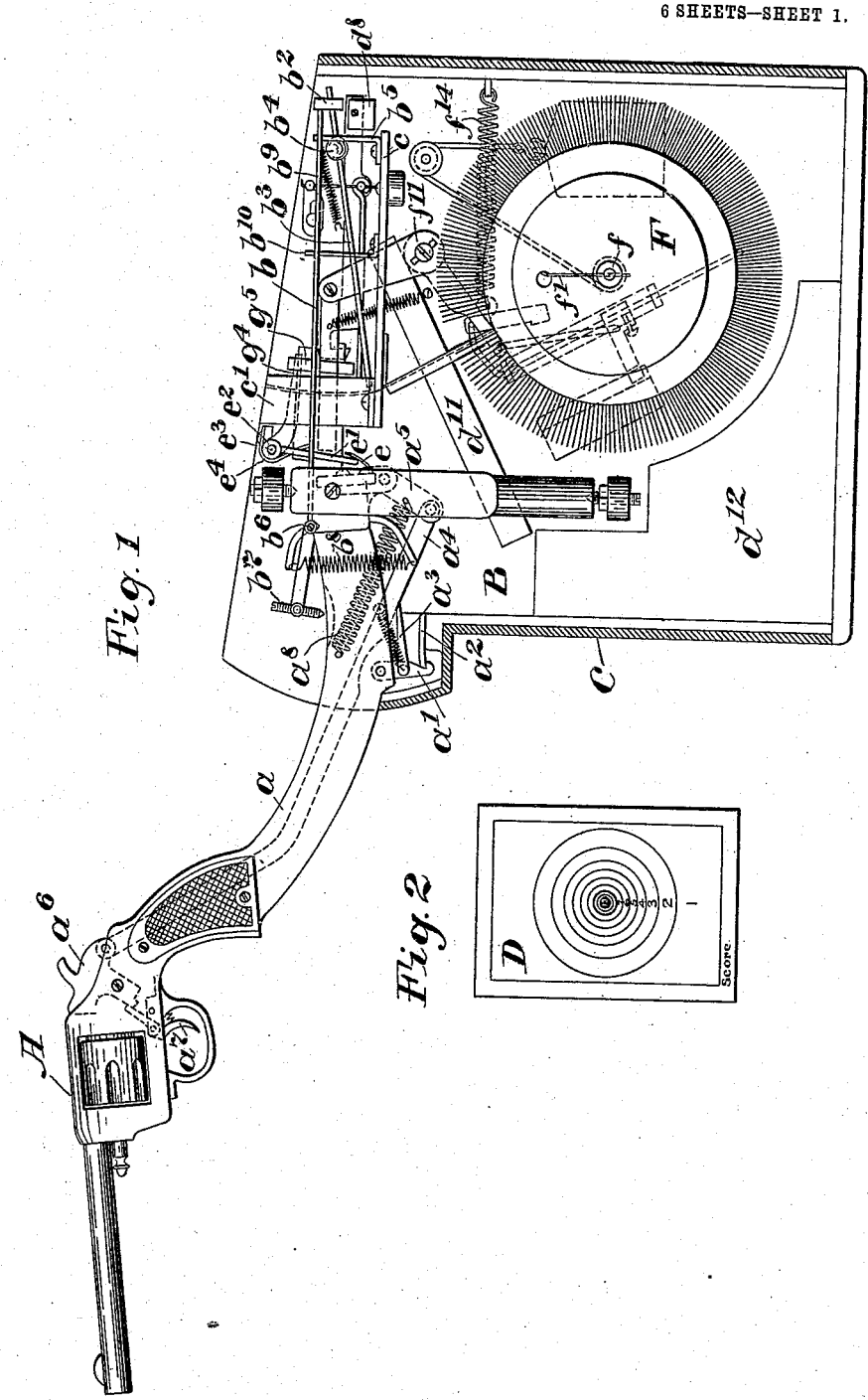
Witnesses,
Horace A. Crossman
Inventor.
Henry H. Cummings
by Frederick L. Emery
Atty.

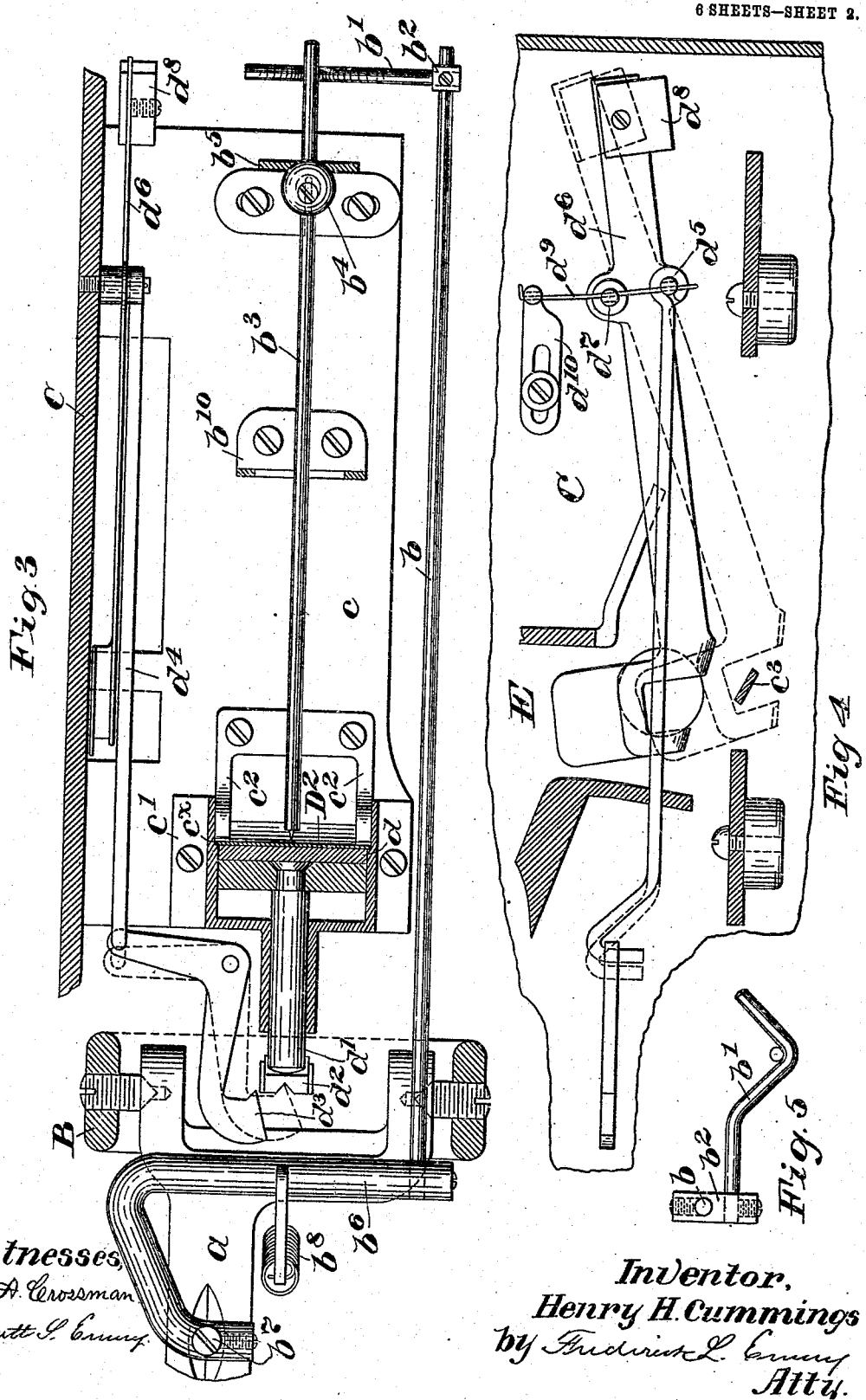

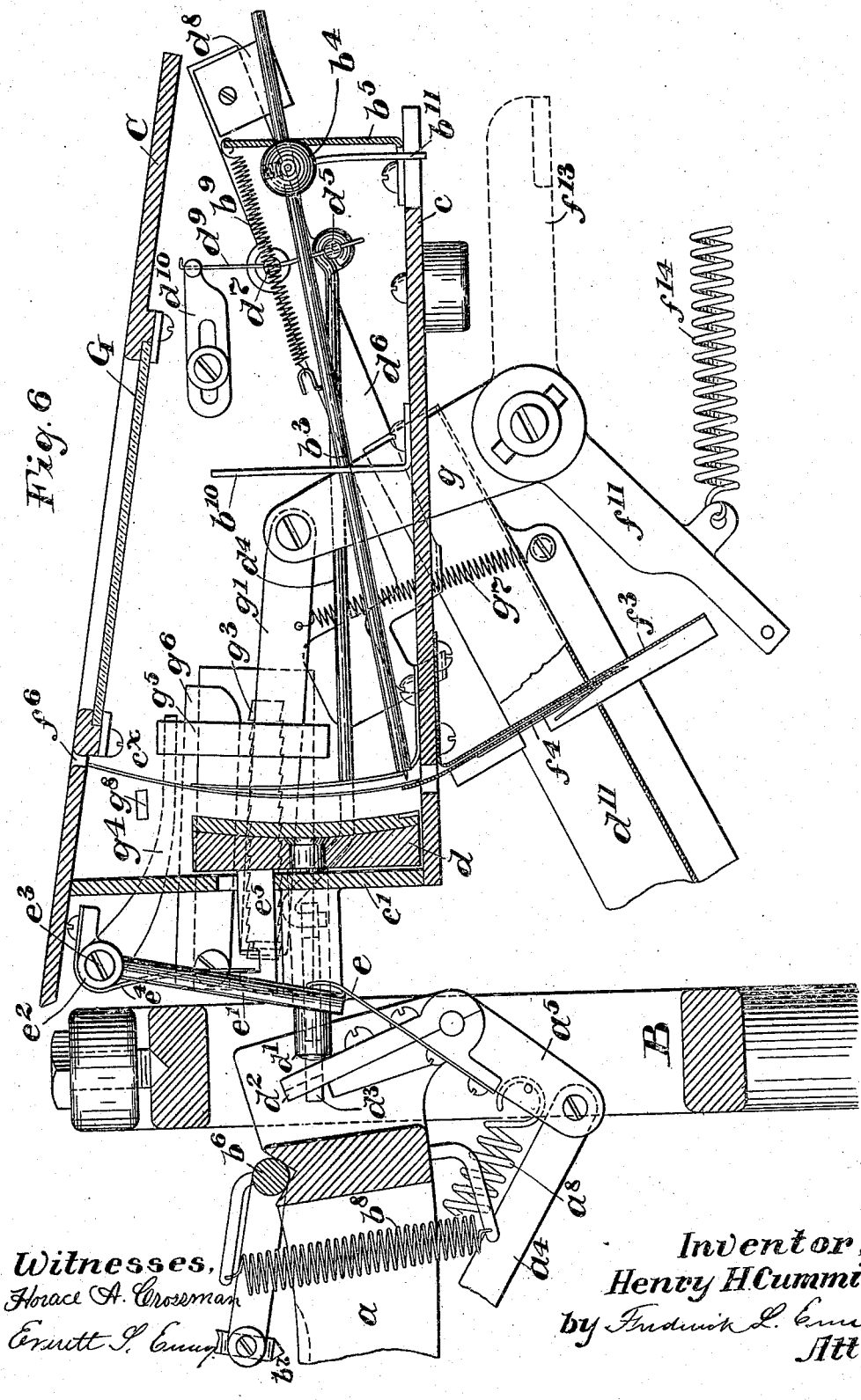

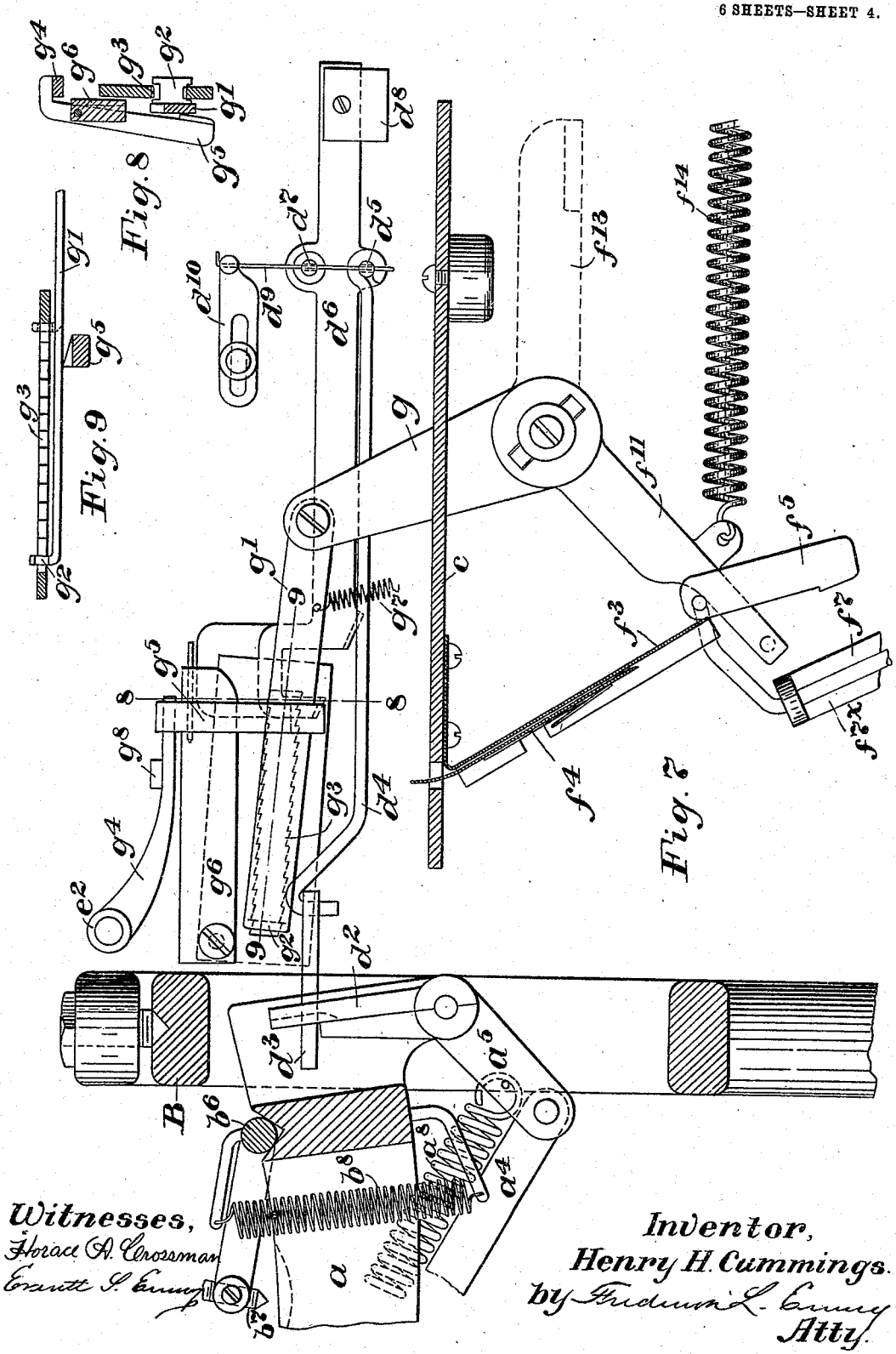

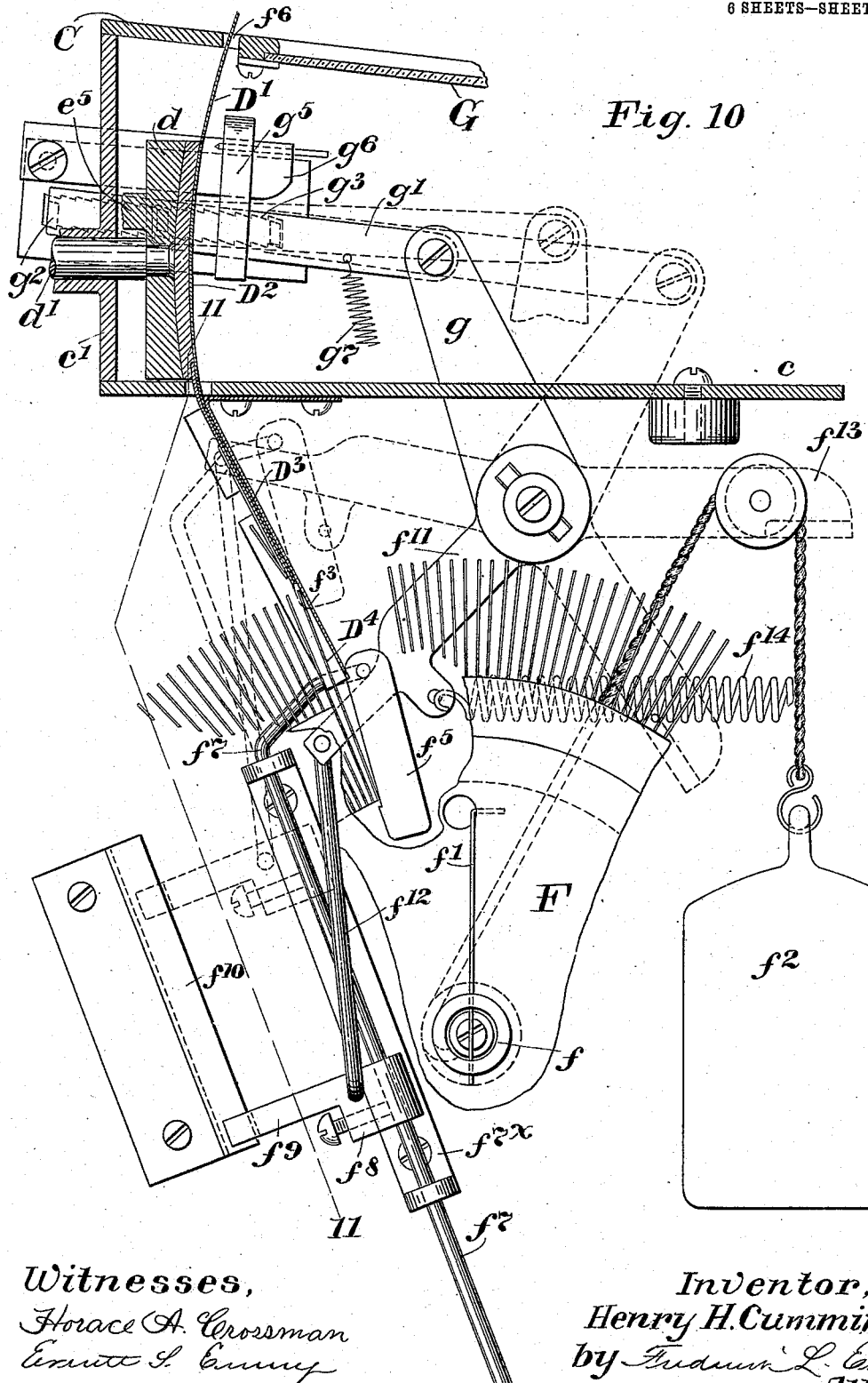

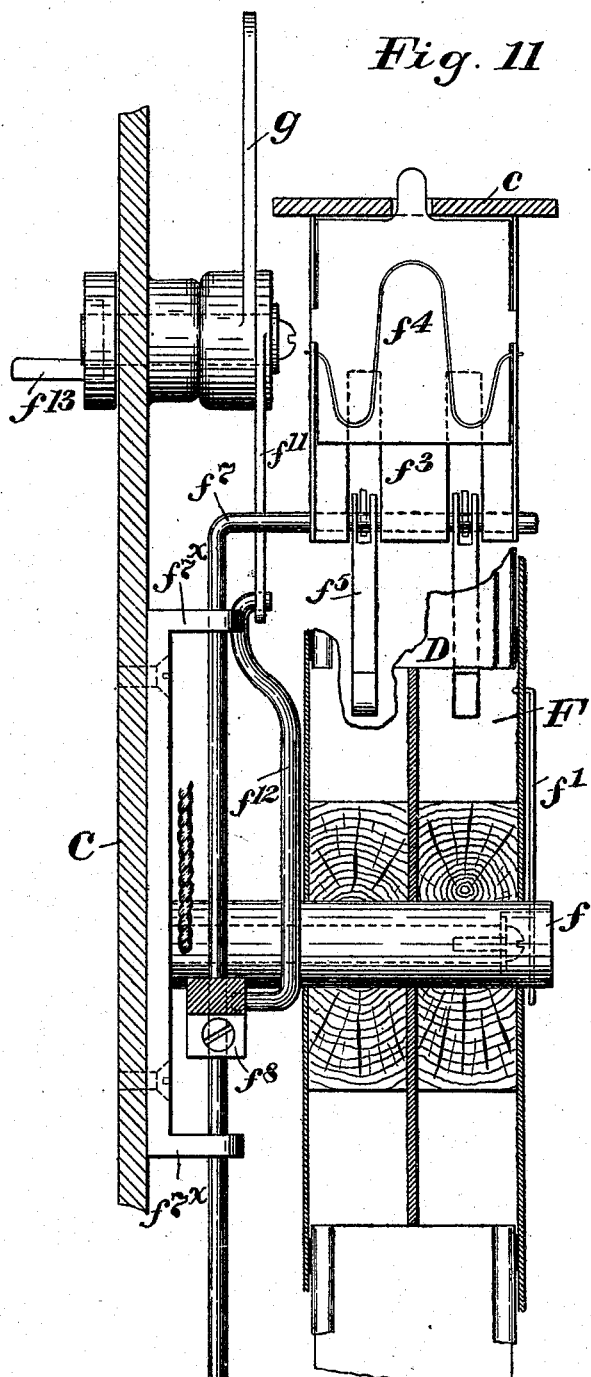

UNITED STATES PATENT OFFICE.

HENRY H. CUMMINGS, OF MALDEN, MASSACHUSETTS, ASSIGNOR TO SUB-TARGET GUN COMPANY, OF SACO, MAINE, A CORPORATION OF MAINE.

COIN-CONTROLLED TARGET-PRACTICE APPARATUS.

941,360.  Specification of Letters Patent.  Patented Nov. 30, 1909.

Application filed August 10, 1903.  Serial No. 168,907.

*To all whom it may concern:*

Be it known that I, HENRY H. CUMMINGS, a citizen of the United States, residing at Malden, county of Middlesex, and State of Massachusetts, have invented an Improvement in Coin-Controlled Target-Practice Apparatus, of which the following description, in connection with the accompanying drawings, is a specification, like letters on the drawings representing like parts.

My invention consists in improvements in coin or check-controlled devices, being particularly, though not exclusively, concerned with coin or check-controlled devices for permitting the practice of marksmanship.

I have herein illustrated and described my invention with reference to a device intended for the practice of marksmanship, wherein is employed an aiming device so mounted as to be capable of an aiming movement with reference to a main target and provided with a suitable follower to follow the aiming movement thereof, and also with suitable recording devices to record the position of the follower upon a sub or miniature target at the time of simulated firing, the object therein being the accurate record of the aim upon the sub-target without the issuance of any projectile from the aiming device. I have also herein described suitable coin controlled mechanism to permit the movement of the aiming device and the record of the aim thereof only upon the insertion of a coin or other suitable operating member; also suitable target feeding devices for ejecting the used sub-target from the apparatus and delivering the same within the grasp of the marksman, and for placing a fresh sub-target from a target magazine in recording position ready for another record or shot.

I herein claim the several features of my invention in combination with, or as applied to, coin or check-controlled devices.

The novel features of my target practice apparatus described which are capable of use apart from coin or check-controlled devices are separately claimed in a co-pending application, Serial No. 178,807 filed October 28, 1903.

My invention will be best understood from the following description, taken in connection with the accompanying illustration of the specific embodiment herein selected, while its scope will be more particularly pointed out in the appended claims.

In the drawings,—Figure 1 is a side elevation of one form of my invention with the housing or casing partially removed to show the contained parts; Fig. 2 is a sub or miniature target upon which the aim is recorded; Fig. 3 is a plan view, partially in section, showing the follower connection and the coin operated releasing lever; Fig. 4 is a fragmentary partial section in elevation of the same; Fig. 5 is a detail of the follower connection; Fig. 6 is an elevation, partially in section, of the recording devices and the lever locking means; Fig. 7 is a sectional elevation showing the lever locking devices for locking the feeding mechanism, other parts being removed; Figs. 8 and 9 are sectional detail views taken on the lines 8—8 and 9—9, respectively in Fig. 7; Fig. 10 is a sectional elevation showing the target feeding devices; Fig. 11 is an elevation in section taken on the line 11—11 in Fig. 10.

Referring to Fig. 1, I have shown a coin controlled target practice apparatus having an aiming device, such as the revolver A, provided with the rearwardly extending arm $a$, secured to the revolver butt, and universally mounted upon a universal support B, carried within and secured to the casing C, which latter may be supported upon a standard or other suitable support of any suitable form or height, but which herein is not shown. The revolver A, is thus supported so as to be capable of a free universal aiming movement, and may be grasped in the hands of the marksman and aimed at any suitable object, such as a distant target. The aiming device, however, is ordinarily secured from aiming movement by the spring catch $a'$, engaging the ledge $a^2$ secured to the casing, which catch, however, is provided with the rearwardly extending finger, $a^3$, spring pressed against the under side of the resetting rod $a^4$, the latter being employed for resetting the recording devices and connecting the bell crank lever $a^5$ and the revolver cock or hammer $a^6$, with which and the trigger $a^7$ the pistol is provided, although in other respects it may either be a dummy device or an actual firearm. The revolver is normally maintained in its uncocked position, as shown in Fig. 1, through the retractile spring $a^8$, secured to the arm $a$, and tending to draw the lever $a^5$ and rod $a^4$ forward to maintain the hammer $a^6$ in its seated position. When the revolver is cocked, the rod $a^4$ forces the lever $a^5$ backward and the finger $a^3$ downward, the latter causing the release of the catch $a'$, the parts being then held in the cocked position and permitting the free aiming movement of the revolver about its universal support until the trigger is pulled. Connected to follow the aiming movement of the aiming device when the latter is free, is the rearwardly extending follower rod $b$ within the casing C and provided at its opposite end with the right-angled finger $b'$ (see Figs. 3 and 5), secured thereto in any suitable way, as by the adjustable connection $b^2$. The finger $b'$ is provided with a crooked end, which underlies the rearwardly projecting shank of the recording needle $b^3$. The latter is also capable of universal movement and for that purpose is provided with a spherical bearing $b^4$, seated in an upright bracket $b^5$, secured to a shelf $c$, which latter may be and herein is a part of the casing C. To connect the follower rod $b$ with the revolver arm $a$ the former is secured at its forward end to a cross pin $b^6$ seated in a transverse V-shaped groove in the arm $a$, such pin having the end opposite to that secured to the rod $b$, bent forwardly in the irregular manner shown and provided with the vertically adjustable positioning point $b^7$ adapted to center itself in the bottom of a coöperating slot in the arm $a$ when the arm is raised after the revolver has been released by cocking.

After the revolver has been raised, the spring $b^8$ tends to pull the positioning point $b^7$ into the slot in the arm $a$ and there maintain it to cause the following rod $b$ to have at all times when the apparatus is in use a fixed, and the same, position relative to the arm and revolver, so that it follows the aiming movement of the latter and correctly transmits the same through the finger $b'$ to the indicating needle $b^3$.

As the revolver is raised, the finger $b'$ is correspondingly lowered. As the revolver is lowered, the finger is raised, and as the former is shifted to one side of the latter, the finger undergoes a proportional opposite movement. During all movements of the follower, however, the needle is caused to remain seated in the crook of the finger $b'$, through the tension spring $b^9$, and the needle point, therefore, reproduces with reference to the sub-target the exact aiming movement of the revolver with reference to the main target, although to a different and greater degree. The sub or miniature target D is secured in a suitable target holder directly in front of the needle point and at the time of simulated firing is forced as hereafter described against the needle point to permanently record the position of the needle and therefore the aim of the revolver at that time.

It is desirable to restrain the movement of the recording needle $b^3$ and limit its range to the face of the sub-target, while permitting at all times free movement of the revolver.

To permit of this, a limiting frame $b^{10}$ is provided, through which the needle passes, acting to limit the movement of the needle when the revolver undergoes excessive deflection in any direction upon its universal support. The connection between the finger $b'$ and the needle, and between the follower $b$ and the revolver arm $a$, provides a yielding connection between the needle and the revolver to permit this excess of movement of the latter over the former. Thus, when the revolver is moved in either direction, so as to bring the needle against the limiting frame, the unseating of the pin $b^6$ from its coöperating slot in the arm $a$, or the unseating of the needle shank from the crooked finger $b'$, permits the further unimpeded movement of the revolver itself. An excessive upward deflection of the revolver causes merely the withdrawal of the finger $b'$ from the needle shank after contact between the needle and the limiting frame has taken place, while an excessive downward deflection thereof causes simply the withdrawal of the positioning point $b^7$ from its coöperating slot, which, it will be observed, is the normal condition when the revolver arm is locked, as shown in Figs. 1 and 6.

For an accurate record, it is necessary that the apparatus be accurately adjusted, and that the needle $b^3$ point to the bull's-eye of the sub-target when the revolver or other firearm points to the bull's-eye of the distant target. To effect this, the revolver is first accurately sighted at the bull's-eye of the main target, and when in this position, the needle, if needs be, is adjusted to point also at the bull's-eye of the sub-target, adjustments in a vertical plane being effected by screwing the threaded positioning point $b^7$ in or out; and adjustments in a horizontal plane, by adjusting the point of connection of the finger $b'$ to the following rod $b$. To permit of a determinate accurate adjustment of the needle even though the latter should become bent, the ball $b^4$ has a depending pin $b^{11}$ playing in a slot in the shelf $c$, to prevent rotation of the needle about its axis, though in no way impeding its free movement.

The target when in position is held in two parallel grooves, $c^x$, in the target case, $c'$ on the shelf $c$, and between the two spring fingers $c^2$ and the movable target pad $d$, the latter being slidably mounted within the target case $c'$ and provided with the propelling or target pin $d'$ against which presses the target hammer $d^2$ secured to bell crank lever $a^5$.

Referring to Figs. 3 and 4, the former of which shows the recording mechanism in the uncocked condition of the revolver, the target hammer $d^2$ is held locked and therefore likewise the revolver hammer and the target pad $d$, by the pivoted locking catch $d^3$ (then in the position shown in dotted lines, Fig. 3.), having an arm secured to the rearwardly extending connecting rod $d^4$. The latter is secured by a pin $d^5$ to the coin-controlled releasing lever, $d^6$, which is pivoted at $d^7$ to the casing C. The releasing lever $d^6$ is provided at its forward end with a coin receptacle beneath a suitable coin slot, E, the latter leading to the upper and outer portion of the casing C, and at its opposite end with a weight $d^8$ to balance the lever about its pivot $d^7$, as shown in Fig. 7, when there is no coin in its receiver.

When a coin is inserted in the slot E and passes into the receiver of the releasing lever $d^6$, the latter is tilted from a horizontal position, not shown in Fig. 4, about its pivot $d^7$ into the full line position shown in Fig. 4, the connecting rod $d^4$ being drawn rearwardly by the retrogression of the lever pin $d^5$, causing thereby the withdrawal of the latch $d^3$ from the hammer $d^2$, the former passing from the dotted to the full line position shown in Fig. 3.

The releasing lever $d^6$ comes to rest in the full line position shown in Fig. 4, where further movement is limited by the action of the spring $d^9$ secured to the adjustable support $d^{10}$, and passing through pivot $d^7$ and the pin $d^5$ with considerable clearance, so as to permit a downward movement of the lever into the full line position shown in Fig. 4 before action of the spring $d^9$ begins. The releasing lever is, however, further depressed by the subsequent cocking of the revolver, which throws the hammer $d^2$ forward against the inclined cam-like surface of the catch $d^3$, pushing the latter out of its path, to force the connecting rod $d^4$ still further backward and the releasing lever $d^6$ farther downward against the action of the spring $d^9$, an exposed edge of the coin then striking a part $c^3$ of the casing, to cause the discharge of the coin from the receiver of the releasing lever into a suitable slide, $d^{11}$, Figs. 1–6, whence it passes into the main coin receiver $d^{12}$, Fig. 1, near the bottom of the casing C. The lever $d^6$, relieved of the weight of the coin, tends to return to its normal, horizontal position, assisting the spring $d^9$ in causing the movement of the catch $d^3$ into its locking position as soon as the hammer $d^2$ has been returned to the position shown in Fig. 3 by firing the revolver.

For setting the recording devices, the bell crank lever $a^5$ is provided (Fig. 6) with an upright spring finger $e$, pressing against the depending arm $e'$, secured to a sleeve $e^2$, pivoted at $e^3$, said sleeve having also a depending spring finger $e^4$ engaging a notch in the forwardly projecting slide $e^5$ secured to the target pad $d$. After a coin has been inserted to cause the withdrawal of the catch $d^3$ from the target hammer $d^2$, and when the revolver has been subsequently cocked to pull the hammer $d^2$ back from the target pin $d'$, the spring finger $e$ forces the rod or pin $e'$ forward, together with its attached spring finger $e^4$, the latter causing the withdrawal of the target pad $d$ from the target, the position shown in Fig. 10, into the position shown in Fig. 6. After the revolver has been aimed and the trigger pulled in the act of simulated firing, the hammer $d^2$, thereby released, is forced against the target rod $d'$, by the spring $a^8$, throwing the target pad against the target to force the latter against the adjacent point of the recording needle. The target pad is preferably faced with some elastic material, such as rubber or felt, and its forcible impact against the target and the resulting needle puncture therefore cause a permanent record of the aim of the revolver.

After the record has been made, the target may be ejected from the apparatus, and delivered within the grasp of the operator by the following means, which suffice also to present in proper position a fresh target for a new trial of marksmanship. A target holder or magazine, F is provided, of any suitable form, but preferably in the form of a circular or disk holder having pockets for holding a supply of sub-targets in outwardly radiating positions, as shown in Figs. 1 and 10. This holder is rotatably mounted upon a spindle, $f$, to which it is secured by the wire clip $f'$, and by which it is given a constant rotative tendency in a right-handed direction (Fig. 10) by means of the weight $f^2$. Leading downwardly from the target case or holder is a target feeding slot, formed by and between the stationary member $f^3$ and the spring pressed member $f^4$, the former being extended down and in front of a target carried by the holder and the latter terminating in a beveled lip just above the upper target edge, so that as the target is lifted out of the holder by the lifting fingers $f^5$ engaging the exposed under target-edge, it naturally finds its way into the slot into which it is forced by the lifting fingers, the stationary members $f^3$ being slotted, Fig. 11, to permit the lifting of the target into the target slot until it has forced the superposed target previously in the slot, into its proper position for record within the target holder. The preceding target, as it is forced out of the slot and into the holder, also pushes the target upon which record has been made, through the exterior slot or opening $f^6$ in the upper wall of the casing, where it projects for a portion of its length and may be readily withdrawn by the operator.

The relative position of the targets, as they progress from the magazine, is shown in Fig. 10, where D′ represents the target just expelled from the machine where it has had imprinted upon it the record of the revolver aim, $D^2$, the target which has forced D′ out of position and is itself in position suitable for receiving its record, $D^3$, the target just lifted from the holder into the slot and $D^4$ that target of those remaining in the holder which is next to be lifted.

To raise the lifting fingers and thereby effect proper feeding of the targets, the same are connected to a rod $f^7$, slidably mounted in suitable guide-ways, $f^{7x}$, secured to the casing C. Sliding with the rod $f^7$ and adjustably secured thereto, is the coupling $f^8$, having an overhanging arm $f^9$, sliding on and guided by the guide-piece $f^{10}$, said coupling $f^8$ connecting the sliding rod $f^7$ with one arm of the bell crank $f^{11}$, through the connecting link $f^{12}$. The lever $f^{11}$ is moved with and by the operating lever $f^{13}$, on the outside of the casing C. When the hand lever, $f^{13}$, is depressed, it moves the bell crank lever $f^{11}$, coupling $f^8$, and rod $f^7$, into the dotted line position shown (Fig. 10) causing the lifting fingers $f^5$ to engage that target which is then in position beneath the target slot and raise the same up and into the slot, as described. As the hand lever $f^{13}$ is released, it is withdrawn into its nominal position by the spring $f^{14}$, and the target feeding parts, including the lifting fingers $f^5$ are restored to the full line position shown in Fig. 10, the target holder being turned through the weight $f^2$, to bring the next succeeding target into position against the stationary member $f^3$ of the target slot.

In order to prevent an incomplete cycle of operations of the target feeding apparatus, which might occur were the hand lever $f^{13}$ only partially depressed and to therefore compel the completion of the movement when once begun, I have provided means for preventing reverse movement of the operating lever until it has reached the limit of its downward stroke and for preventing any further downward movement after its upward stroke has begun.

Referring to Figs. 7 to 10, inclusive, the lever $f^{11}$, has an upright arm $g$, carrying the substantially horizontal locking rod $g′$, the latter being provided at its end with the pawl $g^2$, engaging the teeth of the double ratchet $g^3$, the latter being so constructed as to permit a forward movement of the pawl upon the lower teeth only, and rearward movement upon the upper teeth, the latter corresponding to a depression of the hand lever, and the former to its upward movement.

When the revolver is locked in position and uncocked, awaiting the insertion of a coin, and after the revolver has been cocked and before firing, the target feeding devices, including the hand lever $f^{13}$, are locked, as shown in Fig. 7, by the engagement of the pawl $g^2$, in forward position, with the lower set of ratchet teeth. The cocking of the revolver, however, forcing the depending pin $e′$ on the sleeve $e^2$ forward, as it does, through the spring finger $e$, depresses also a rearwardly extending arm $g^4$, secured to the sleeve $e^2$, and permits the pivotally mounted catch $g^5$, Figs. 7 and 8, to swing in under the lever $g′$, the catch being pivoted upon the swinging arm $g^6$, which is lowered as the arm $g^4$ is depressed. When the revolver is fired, the hammer $d^2$, target rod $d′$, and target pad $d$, are thrown rearwardly, and the spring $e^4$ is put under tension, causing the sleeve $e^2$ and the arm $g^4$ to swing upward, the latter carrying the catch $g^5$ with its swinging arm $g^6$ and lifting the lever $g′$ to cause the pawl $g^2$ to contact with the upper row of teeth in the ratchet $g^3$. The handle $f^{13}$ may then be depressed to actuate the target feed, the locking lever $g′$ and the pawl $g^2$ moving to the rear end of the ratchet $g^3$ through the intermediate position fragmentarily shown in dotted lines in Fig. 10. At the end of its rearward movement the locking lever $g′$ frees itself from the catch $g^5$ (Fig. 9) and is pulled into its lower position through the tension spring $g^7$, to cause engagement between the pawl $g^2$ and the lower set of ratchet teeth. On releasing the pressure on the hand lever $g^{13}$, the reverse movement of the feed mechanism takes place through the spring $f^{14}$, the locking lever $g′$ and pawl $g^3$ moving from the rearward dotted line position shown in Fig. 10 to full line position therein. Thus, it will be seen that at no position in its movement is the locking lever $g′$ capable of a retrograde movement. When the lever $g′$ in its rearward position frees itself from the catch $g^5$, the arm $g^4$ is lifted against the stop $g^8$, where it is held preparatory for subsequent depression when the revolver is again cocked. At the time of firing the revolver, the tension upon the spring $e^4$ which causes the lifting of the pawl $g^2$ against the upper set of ratchet teeth, also serves to slightly withdraw the target pad from the needle point to free the target therefrom, so that further movement of the needle will not mar the target or injure the needle point.

When in operation, the casing C with its contained parts, is placed upon a pedestal or other suitable support so arranged with reference to a main target that the pistol when freed may be aimed thereat. A standard target may be used for this purpose at the standard distance, or, the same may be proportionately reduced for a lesser distance to economize space when the full range distance is not available. The sub-target D is preferably an exact reproduction of the main target but appropriately reduced.

The apparatus being locked, as shown in Fig. 1, a coin is inserted in the coin slot, causing release of the hammer catch, $d^3$. The revolver may then and not until then be cocked, which causes the release of the catch $a'$, freeing the instrument for aiming purposes, and further sets the recording devices in the position shown in Fig. 6. As the marksman now aims at the main target, the needle, which is visible through glass wall G, in the casing C, correctly reproduces the direction of the trajectory of the firearm with reference to the sub or miniature target D. When the trigger $a^7$ is pulled to imitate the act of firing, the target pad is thrown against the target to record the needle position and consequently the aim thereon, and the locking lever $g'$ is simultaneously lifted to unlock the feeding mechanism and permit through the manipulation of the feeding lever $f^{13}$, the expulsion of the record target and the introduction in its place of a fresh one for repetition of the trial.

It will be obvious that my invention is in no respect limited to the details herein shown, or to the form and arrangement of parts selected for the purpose of describing my invention, but that the latter is capable of embodiment in many forms, and moreover that various individual features herein described are as well capable of use in other combinations and other connections.

Claims.

1. In a coin apparatus, a fulcrumed lever adapted to receive an inserted coin and to be oscillated thereby, means for normally holding it in coin receiving position, a vibratory member, a pivoted locking device normally acting to prevent movement thereof, and a connection between the same and said lever, the latter being actuated by the movement of said lever to operate said locking device for locking or unlocking said vibratory member.

2. In a coin controlled apparatus, a pivoted lever having a coin receiving means at one end and a counterbalance at the other, the latter normally operating to hold the former in coin receiving position, a reciprocatory member, an actuator therefor and normally in engagement therewith, an oscillatory locking device normally operating to hold the latter in inoperative position and a link connecting said locking member and said coin receiving lever and for transmitting motion of the latter to the former.

3. In a coin controlled apparatus, a casing having a coin passage, a pivoted counterbalance lever adapted to receive and carry a coin at one end and having a counterbalance at the other for normally holding the coin receiving end in position to receive a coin from said passage, a fulcrum pin on which said lever is mounted, a pin on said lever below its fulcrum and a spring secured to the casing at one end and inserted loosely through the said pins, and an operating member connected with the lower pin and movable therewith, said spring coöperating with said counterbalance in returning the lever to its normal coin receiving position.

4. In a coin controlled apparatus, a casing having a coin passage, a pivoted counterbalance lever adapted to receive and carry a coin at one end and having a counterbalance at the other for normally holding the coin receiving end in position to receive a coin from said passage, a fulcrum pin on which said lever is mounted, a pin on said lever below its fulcrum and a spring secured to the casing at one end and inserted loosely through the said pins, and means for adjusting the casing end of said spring, the latter coöperating with said counterbalance in returning the lever to its normal coin receiving position.

5. The combination with a pivoted coin or check-receiving lever, counter-balancing means for one end thereof tending to turn the coin-receiving portion to a coin-receiving position, means interposing a resistance to movement of said lever to a fully depressed position when a coin or check is deposited therein to permit a partial depression thereof only, an indepndently movable latching device adapted to be moved by said lever on its movement to a partly depressed position, and means subsequently to move said lever to a fully depressed position.

6. The combination with a pivoted coin or check-receiving lever, counter-balancing means for one end thereof tending to turn the coin-receiving portion to a coin-receiving position, means interposing a resistance to movement of said lever to a fully depressed position when a coin or check is deposited therein, a latching device adapted to be moved by said lever on its movement to a partly depressed position, and means acting through subsequent movement of said latching device to cause further movement of said coin-receiving lever to its fully depressed position.

7. In a coin or check controlled apparatus, the combination with a pivoted coin-receiving lever, of independently movable latching means operated thereby, means providing for the control of said latching means through movement of said coin-receiving lever to a depressed position, and means subsequently acting to further depress said lever for the discharge of the coin.

8. In a coin-controlled apparatus, the combination with a hammer $d^2$ adapted to be actuated, a catch $d^3$ adapted to lock the same against movement, a coin-controlled lever $d^6$, and a connection $d^4$ between the lever and the catch through which the two connected parts, viz., the lever and the latch, are adapted to effect each the movement of the other.

9. In a check controlled apparatus, the combination with a check-receiving lever, a latching device, means for interposing a yielding resistance to movement of the lever to a fully depressed position on insertion of a check, and means for acting upon said yielding resistance through said latching device for causing the subsequent movement of said lever to a fully depressed position.

In testimony whereof, I have signed my name to this specification, in the presence of two subscribing witnesses.

HENRY H. CUMMINGS.

Witnesses:
   THOMAS B. BOOTH,
   EVERETT T. EMERY.